United States Patent [19]

Kamosaki et al.

[11] 3,932,340

[45] Jan. 13, 1976

[54] NYLON COATING COMPOSITION

[75] Inventors: Minoru Kamosaki; Sigel Asai, both of Saitama, Japan

[73] Assignee: Daicel Ltd., Osaka, Japan

[22] Filed: Aug. 19, 1974

[21] Appl. No.: 498,396

[30] Foreign Application Priority Data

Aug. 21, 1973 Japan................................ 48-93569

[52] U.S. Cl... 260/33.4 R; 260/33.6 R; 260/33.8 R; 260/857 TW
[51] Int. Cl.²... C08K 5/01; C08K 5/02; C08K 5/05; C08L 77/02
[58] Field of Search... 260/857 TW, 33.4 R, 33.6 R, 260/33.8 R

[56] References Cited

UNITED STATES PATENTS

| | | | |
|---|---|---|---|
| 3,160,677 | 12/1964 | Duxbury | 260/857 TW |
| 3,474,061 | 10/1969 | von Bonin et al. | 260/33.4 R |
| 3,489,724 | 1/1970 | Iwakura et al. | 260/33.4 R |
| 3,674,752 | 7/1972 | Ridgway et al. | 260/33.4 R |
| 3,725,503 | 4/1973 | Kunde et al. | 260/857 TW |
| 3,839,496 | 10/1974 | Becht et al. | 260/857 TW |

*Primary Examiner*—Allan Lieberman
*Attorney, Agent, or Firm*—Woodhams, Blanchard and Flynn

[57] ABSTRACT

A coating composition is disclosed for producing alcohol-insoluble films which comprises a mixture of an alcohol-soluble nylon copolymer, an alcohol-soluble alkoxymethylated nylon and an acid catalyst.

5 Claims, 1 Drawing Figure

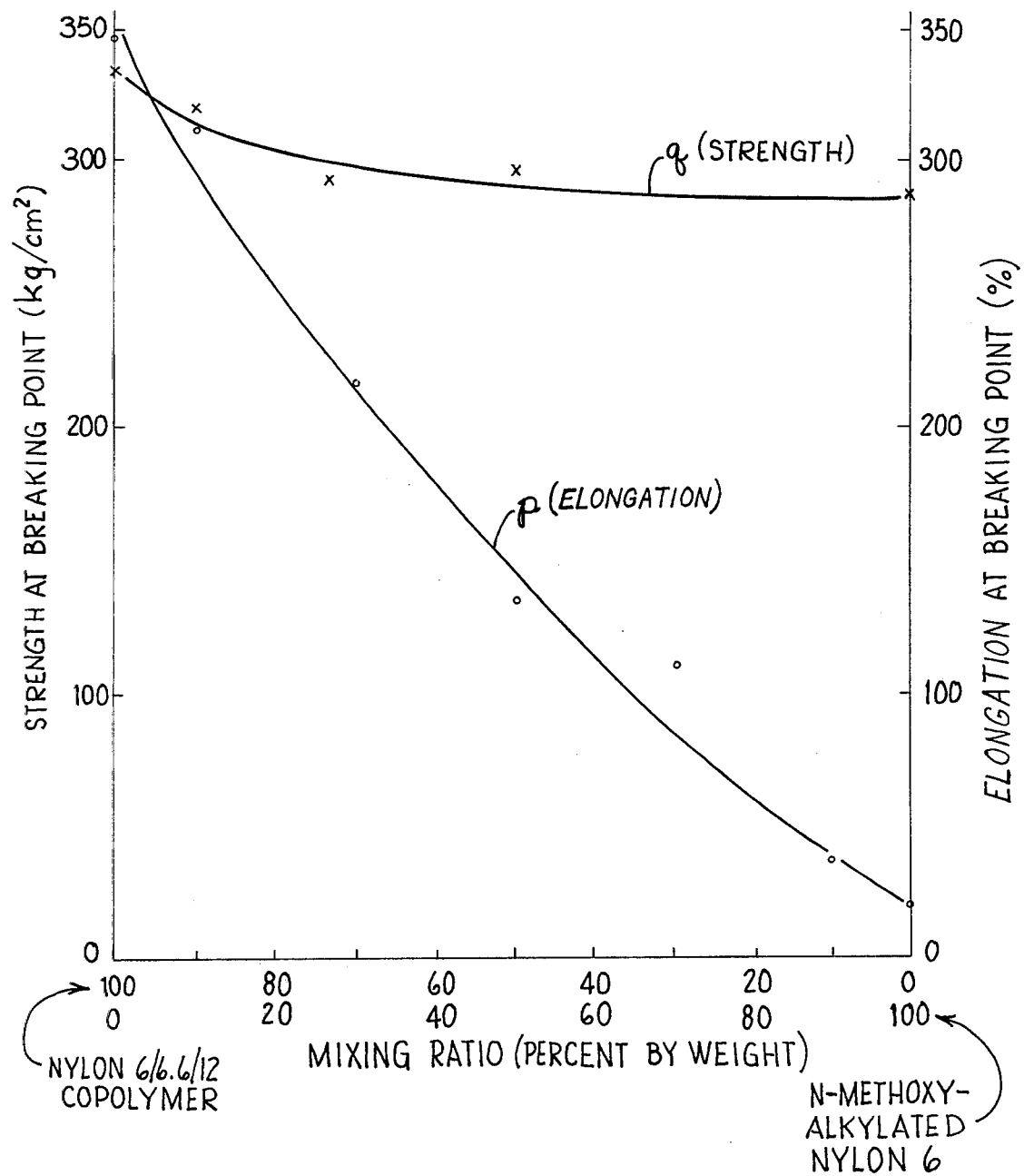

NYLON COATING COMPOSITION

BACKGROUND OF THE INVENTION

1. FIELD OF THE INVENTION

The present invention relates to a coating composition for forming alcohol-insoluble nylon coating films.

2. DESCRIPTION OF THE PRIOR ART

As alcohol-soluble nylons generally used as surface-finishing agents or adhesives, there may be mentioned (1) nylon copolymers comprising monomer units of two, three or four members selected from the group consisting of nylon 6, nylon 6.6, nylon 6.10, nylon 11, nylon 12 and nylon 6.12, and (2) N-alkoxymethylated nylons. In general, the nylon copolymers are superior to N-alkoxymethylated nylons in mechanical or physical properties. On the other hand, the N-alkoxymethylated nylons can be insolubilized in alcohol by adding an acid thereto.

The alcohol-soluble nylon copolymers are thus soluble in a lower alcohol such as methanol or ethanol or a solvent mixture of such a lower alcohol and a chlorinated hydrocarbon or aromatic hydrocarbon such as trichloroethylene or toluene.

The object to be coated is dipped into the solution thus obtained or the solution is applied to the object with a roll or brush to form a coating thereon and then the object is heated to remove the solvent, thereby forming the nylon coating film. The film thus formed has an excellent abrasive resistance and adhesive strength to the object.

Further, nylon coating films have a special desirable touch which cannot be obtained by other materials, and, therefore, they have been used widely as surface treating agents or adhesives for textiles, woods, papers, leathers, rubbers and metals. However, the coating films thus formed from the alcoholsoluble nylon copolymers are reversibly soluble in alcohols and, accordingly, they cannot be used for coating an object which will be contacted with alcohols. Under the circumstances as above, many attempts have been made to insolubilize the coating films of alcohol-soluble nylon copolymers.

There has been proposed a process wherein a light-sensitive cross-linking agent such as N,N-methylene-bisacrylamide is added to a coating composition and it is then exposed to ultraviolet rays to insolubilize the same, and a process wherein melamine is added to the composition and it is then heated to insolubilize the same. However, these prior processes have been troublesome, because treatment with ultraviolet rays is required or the temperature employed in the insolubilization by heating is sometimes excessively high.

SUMMARY OF THE INVENTION

We have discovered that nylon film coatings which are insoluble in alcohols, can be obtained from a solution prepared by adding to (1) an alcohol-soluble copolymerized nylon such as ε-caprolactam/hexamethylenediamine adipate copolymer (nylon 6/6.6), ε-caprolactam/laurolactam copolymer (nylon 6/12), ε-caprolactam/hexamethylenediamine adipate/laurolactam terpolymer (nylon 6/6.6/12) or ε-caprolactam/hexamethylenediamine adipate/hexamethylenedodecanedioamide terpolymer (nylon 6/6.6/6.12), (2) from 5 to 90 weight percent, based on the total weight of resins (1) plus (2), (calculated as an N-alkoxymethylated nylond having a degree of alkoxymethylation of 30 molar percent) of an N-alkoxymethylated nylon such as methoxymethylated ε-caprolactam polymer, methoxymethylated hexamethylenediamine adipate polymer, methoxymethylated ε-caprolactam/laurolactam copolymer or propoxymethylated ε-caprolactam polymer, and further adding thereto (3) from 0.5 to 8 weight percent, preferably 2 to 5 weight percent, based on the weight of the N-alkoxymethylated nylon, of an aliphatic carboxylic acid such as tartaric acid, maleic acid, crotonic acid, malonic acid, succinic acid, oxalic acid, adipic acid or citric acid, an aromatic carboxylic acid such as o-, m- or p-hydroxybenzoic acid, 2,4-dihydroxybenzoic acid, or 2-hydroxy-4-methoxybenzoic acid or an inorganic acid such as hypophosphorous acid. Also ptoluenesulfonic acid and chromic acid anhydride can be used. The present invention has been attained on the basis of this discovery.

Although the insolubilization of an N-alkoxymethylated nylon in the presence of an acid catalyst is known, it is a surprising phenomenon, which is unexpected from conventional techniques, that an alcohol-soluble nylon copolymer can be insolubilized by adding thereto from about 5 to 90 weight percent, preferably 5 to 30 weight percent, based on the total resins, of an N-alkoxymethylated nylon having a degree of alkoxymethylation of 30 molar percent, together with said acid.

The insolubilization phenomenon that occurs as described above is considered to be owing to the fact that the N-alkoxymethylated nylon coils around the alcohol-soluble, nylon copolymer when it is cross-linked by the acid under heating.

BRIEF DESCRIPTION OF THE DRAWING

The drawing is a graph showing the results of tensile tests of films made of compositions comprising an alcohol-soluble nylond 6/6.6/12 copolymer (ε-caprolactam (nylon 6):hexamethylenediamine adipate (nylon 6:6):laurolactam (nylon 12), weight ratio=1:1:1) and an N-alkoxymethylated nylon 6 (degree of methoxymethylation-about 30 percent) in various proportions and containing 5 weight percent, based on the weight of N-alkoxymethylated nylon, of hypophosphorous acid as catalyst. Curve p shows the elongation (%) at the breaking point. Curve q shows the strength (kg/cm$^2$) at the breaking point.

In a solubilization test, it was found that the composition of the alcohol-soluble nylon 6/6.6/12 copolymer and the N-alkoxymethylated nylon 6 become insoluble if the amount of the latter is 5 wt. percent or more. Thus, the proportion of the components of the composition of the present invention can be selected suitably depending upon the use, according to the drawing and the results of the alcohol solubilization test.

The coating compositions can be prepared by mixing an alcohol-soluble copolymerized nylon, the acid catalyst, and an alcohol-soluble alkoxymethylated nylon in a mutual solvent, such as an alkanol of 1 to 6 carbon atoms, a chlorinated aliphatic hydrocarbon of 1 to 6 carbon atoms or an aromatic hydrocarbon or mixtures thereof. In use the coating is applied, the solvent removed and the coating cured by heating to form a cured and finished film.

DETAILED DESCRIPTION OF THE INVENTION

The present invention will be further described by reference to the following illustrative Examples.

EXAMPLE 1

A 20 percent solution of an alcohol-soluble nylon 6/6.6/12 copolymer (ε-caprolactam (nylon 6):hexamethylenediamine adipate (nylon 6.6):laurolactam (nylon 12), weight ratio=1:1:1 in methanol/toluene (weight ratio=7.3) and a 20 percent solution of an N-methoxymethylated nylon 6 (degree of methoxymethylation = about 30 percent) in methanol/toluene (weight ratio = 7.3), to which 5 weight percent of hypophosphorous acid, based on the weight of the N-methoxymethylated nylon, was added, were prepared, respectively. The two solutions thus prepared were mixed together in the proportions as shown in Table 1. Each of the mixtures was applied to an aluminum plate and was cured at 140°C for 5 minutes to form a coating film. In all of A, B and C, the adhesive properties were excellent. Film A was somewhat soft. Film C was quite hard. Film B had a suitable hardness.

EXAMPLE 2

The two solutions prepared in Example 1 were mixed together in the proportions as shown in Table 1. Each of the mixtures was applied to a rubber plate and was cured at 140°C for 5 minutes. After immersion in alcohol for three days, film A was attacked a little but films B and C were not changed. The elongation of film B was too low and the film C had no elongation at all and, accordingly, in both cases, the nylon coating films came off when the rubber plates coated with the films were stretched. Film D was very excellent, because a plasticizer (benzenesulfonebutylamide, 10 weight percent) was incorporated therein to increase its softness. In rubber gloves the whole surface of which had been coated with film D, the coating film did not come off at all in the use, and the softness of the gloves was similar to untreated rubber gloves.

EXAMPLES 3

The two solutions prepared in Example 1 were mixed together in the proportions as shown in Table 1. Each of the mixtures was applied to leather and was cured at 140°C for 5 minutes. Film A had superior softness and touch to films B and C.

Table 1

|  |  | Substance to be coated | Alcohol-soluble copolymerized nylon N-alkoxymethyl- lated nylon 6 | Remark |
|---|---|---|---|---|
| Example 1 | A | Aluminum | 9 / 1 |  |
|  | B |  | 6 / 4 |  |
|  | C |  | 3 / 7 |  |
| Example 2 | A | Rubber | 9 / 1 |  |
|  | B |  | 7 / 3 |  |
|  | C |  | 3 / 7 |  |
|  | D |  | 7 / 3 | Added with plasticizer |
| Example 3 | A | Leather | 9 / 1 |  |
|  | B |  | 8 / 2 |  |
|  | C |  | 3 / 7 |  |

As the alcohol solubilization test, the 20% solution of the N-methoxymethylated nylon 6 prepared in Example 1, which contained 5 wt.% of hypophosphorous acid based on the N-methoxymethylated nylon, was added to the 20% solution of the methanol-soluble nylon copolymer prepared in Example 1 in an amount which will make the amount of the former to be 5 wt.% or more based on the total resins. From the obtained solution, a film was made by casting and this film was heat-treated at 140°C for 5 minutes. The thus obtained film was insoluble in methanol.

In the tensile tests shown in the drawing, the films were made by a solution casting method in a thickness of about 100 μ. The films obtained by casting were heat-treated at 140°C for 5 minutes and the tensile strength of the film was measured by a tensile tester (TENSILON UTM-2) at 500 mm/min.

As will be seen from the drawing, while the strength at the breaking point does not substantially change depending on the amounts of the N-methoxymethylated nylon 6 added, the elongation at the breaking point changes remarkably depending on the amount of the N-methoxymethylated nylon 6. Thus, the addition of the N-methoxymethylated nylon to the alcohol-soluble nylon copolymer in an amount of more than 90 wt.% based on the total resins is not preferable, since it will lower the elongation of the film too much.

Generally, in such cases as the coating of metal articles where elongation of the coated films is not required, the amount of addition of the N-methoxymethylated nylon can be made larger, while, in such cases as the coating of rubber articles where elongation of the coated films is required, the amount of addition of the N-methoxymethylated nylon should be made relatively small, thus enabling to conduct the coating in a manner suitable to the object to the coated.

The embodiments of the invention in which an exclusive property or privilege is claimed are defined as follows:

1. A coating composition comprising a solution of (1) an alcohol-soluble nylon polymer selected from the group consisting of ε-caprolactam/hexamethylenediamine adipate copolymer, ε-caprolactam/laurolactam copolymer, ε-caprolactam/hexamethylenediamine adipate/laurolactam terpolymer and ε-caprolactam/hexamethylenediamine adipate/hexamethylenedodecanediamide terpolymer, (2) from 5 to 90 weight percent of the total of (1) and (2), calculated as an N-alkoxymethylated nylon of a degree of alkoxymethylation of 30 molar percent, of an N-alkoxymethylated nylon selected from the group consisting of methoxymethylated ε-caprolactam polymer, methoxymethylated hexamethylenediamine adipate polymer, methoxymethylated ε-caprolactam/laurolactam copolymer and propoxymethylated ε-caprolactam polymer, and (3) from 0.5 to 8 weight percent, based on the weight of the N-alkoxymethylated nylon (2), of an acid catalyst selected from the group consisting of tartaric acid, maleic acid, crotonic acid, malonic acid, succinic acid, oxalic acid, adipic acid, citric acid, o-, m- and p-hydroxybenzoic acids, 2,4-dihydroxybenzoic acid, 2-hydroxy-4-methoxybenzoic acid, hypophosphorous acid, chromic acid anhydride and p-toluenesulfonic acid, dissolved in (4) a solvent selected from the group consisting of alkanols of 1 to 6 carbon atoms, chlorinated aliphatic hydrocarbons of 1 to 6 carbon atoms, aromatic hydrocarbons and mixtures thereof.

2. The composition according to claim 1 wherein the acid catalyst is hypophosphorous acid.

3. The composition according to claim 2 wherein said nylon polymer is a terpolymer of ε-caprolactam/hexamethylenediamine adipate/laurolactam, in a weight ratio of 1/1/1, and said N-alkoxymethylated nylon is N-methoxymethylated ε-caprolactam polymer.

4. The composition according to claim 1 wherein the amount of said acid catalyst is from 2 to 5 weight percent, based on the weight of said N-alkoxymethylated nylon.

5. The composition according to claim 1 wherein the amount of said N-alkoxymethylated nylon is from 5 to 30 weight percent of of the total of (1) and (2).

* * * * *